UNITED STATES PATENT OFFICE 2,177,269

STABILIZATION OF SOLUBLE CRYSTALLINE MATERIALS

Roy William Sullivan, Cragmere, Del., assignor to E. I. du Pont de Nemours & Company, Wilmington, Del., a corporation of Delaware No Drawing. Application January 4, 1938, Serial No. 183,322

16 Claims. (Cl. 134—58)

This invention relates to the treatment of slightly soluble crystalline materials or compounds useful as pigment extenders, fillers, substrates or bases, to render the same stable and resistant to hydration and particle size increase. More particularly, the invention involves the treatment of pigment-useful alkaline earth metal compounds, such as sulfates or carbonates, with a novel type of inhibiting agent which effectively prevents the hydration or increase in particle size of such compounds when contacted with aqueous media.

In a more specific and preferred embodiment, the invention relates to the stabilization of calcium sulfate, and especially its anhydrite modification, in order to effectively and permanently eliminate the usual tendency towards hydration and particle size increase which these compounds exhibit on contact with water.

The individual particles going to make up the crystalline materials or compounds referred to, and especially useful for pigment or extender purposes, exhibit an objectionable tendency to "grow" or increase in size when contacted with aqueous media. Calcium sulfate is especially subject to this condition, and, accordingly, the invention will be hereinafter exemplified and illustratively described in connection with its particular adaptation to such type of pigment extender or filler.

Calcium sulfate occurs in several forms, i. e., as soluble or insoluble anhydrite calcium sulfate (CaSO$_4$), as the dihydrate, gypsum

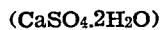
(CaSO$_4$.2H$_2$O)

or the hemihydrate, plaster of Paris

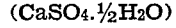
(CaSO$_4$.½H$_2$O)

Finely-divided naturally occurring or artificially prepared insoluble anhydrite is especially useful as a pigment extender or filler, and is characterized by a specific X-ray diffraction pattern. Its particle size may vary to as high as 10 microns, but for pigment purposes preferably ranges from, say, 0.2 to 2.0 microns. These small particles are extremely reactive and this is especially true if the product has not been dehydrated at high temperatures. When this finely-divided calcium sulfate comes in contact with water, its particles hydrate and "grow" or increase in size, due to formation of long, needle-like, acicular gypsum. During pigment processing the calcium sulfate filler or base must contact water for prolonged periods of time, especially during the washing and filtration stages of such manufacture, and ample opportunity is thus afforded for the formation of these acicular gypsum particles. These acicular particles are relatively large and coarse in nature and very objectionable due to the fact that the calcium sulfate is thereby rendered unfit for most practical uses. Their presence is especially objectionable in calcium sulfate employed as an extender for such prime pigments as titanium oxide, zinc sulfide, etc., or as a substrate or base for lakes or toner pigment colors, because the acicular particles deleteriously affect the texture, tinting strength and hiding power of the resultant pigment.

With a view to controlling the formation of needle-like crystals during gypsum precipitation from aqueous media, or retarding the setting of plaster of Paris, certain albuminoids, i. e., glue, gelatin and egg albumin, have been proposed as useful. (U. S. Patent to Wallerstein 879,603; Kolloid Z. 25, 62 (1919) Traube.) These agents have not proven satisfactory or effective and, since such agents are subject to bacterial decomposition, their use involves the additional disadvantage of subsequently giving off offensive and objectionable odors.

It is among the objects of my invention to overcome these and other disadvantages which the use of prior treating agents has involved, and to provide a novel and improved type of treating or restraining agent which is particularly effective for inhibiting the hydration and/or particle size growth of pigment-useful, slightly soluble crystalline materials of the type mentioned. An additional and particular object includes the provision of a novel treating agent especially adapted to stabilize pigment-useful extenders or fillers when in contact with aqueous media, and which effectively inhibits their hydration or particle size growth during pigment processing, i. e., when said extenders and fillers must remain suspended in aqueous media with a prime pigment during washing, bleaching, water-classifying, filtering or during drying. An especial object of the invention includes the provision of a restraining agent particularly effective in stabilizing pigment-useful calcium sulfate and its insoluble anhydrite modification against hydration and particle size increase.

These and other objects are obtainable in the present invention, which broadly comprises treating an alkaline earth metal sulfate or carbonate, useful as a pigment extender, filler, substrate or base, with a water-soluble glycolate whereby the same becomes stable and resistant against hydration and particle size increase.

In one specific and preferred embodiment, the invention comprises treating finely divided calcium sulfate, and especially insoluble anhydrite, with a water-soluble glycolate compound, to effectively inhibit its hydration and particle size increase when subjected to contact with aqueous media.

Glycolate compounds useful in the present invention comprise the water-soluble variety and constitute a new class of compounds, the properties, characteristics and methods of preparation of which are more particularly described and set out in United States Letters Patents 1,682,292 and 2,060,056. While generally all types of soluble glycolate compounds are useful in my invention, those especially adapted and readily available comprise the alkali metal salts of cellulose and starch glycolate, which may be prepared, for example, by the interaction of sodium chloracetate in alkaline suspensions of cellulose, starch or similar compounds represented by the general formula $(C_6H_{10}O_5)_x$, wherein "$x$" is a large positive integer. These glycolate compounds will be found to vary in composition and solubility in water and alkali hydroxide solutions. The amount of polymerization will also depend on the conditions of preparation and will affect somewhat their inhibiting properties. Generally, they may be prepared as relatively soluble sodium salts, which, as 5% solutions are quite thick and jelly-like in consistency and on dilution with water produce less viscous solutions. These solutions may be dried to produce a relatively dry material which may be powdered, and in such state, directly employed in the treatment of the alkali earth metal sulfate or carbonate. As indicated, I preferably employ the soluble sodium salt glycolate, although this is selected for economical reasons only. Obviously, other alkali metal salts, such as those of lithium and potassium, may also be employed. Since the compounds potassium cellulose glycolate and potassium starch glycolate are as useful as the corresponding sodium or lithium salts, I designate these useful compounds as "alkali metal cellulose glycolates" and "alkali metal starch glycolates," generically comprehending useful glycolate compounds in the invention, here and in the appended claims, by the term "soluble glycolate compounds."

In one embodiment of the invention, involving the treatment and stabilization of calcium sulfate in anhydrite form, an aqueous solution, containing from about .1% to 5% of a water-soluble cellulose or starch glycolate compound, may be added to an aqueous slurry containing the anhydrite, suitable agitation of the slurry being had after addition to intimately associate the glycolate compound with the suspended anhydrite particles. Glycolate addition is effected, preferably, immediately subsequent to anhydrite formation. Thus, for example, in processes wherein the calcium sulfate is obtained by dehydrating gypsum with strong sulfuric acid, or the anhydrite is prepared by interacting milk of lime with sulfuric acid at elevated temperatures, it must be separated from the reaction medium by washing, to remove acid, filter pressing and drying then being had. In the latter stages of this processing, during which it may be desirable to blend the anhydrite with a prime pigment, such as titanium oxide, zinc sulfide, etc., prolonged water contact is had, during which ample opportunity is afforded for hydration and formation of gypsum crystals. Transformation to gypsum will be prevented if the solution of glycolate is added to the slurry immediately following anhydrate formation.

As indicated, relatively small amounts of a soluble glycolate compound need be employed for the purpose. Usually about .1%, based on the weight of the calcium sulfate present in the slurry, or about .25 gram of glycolate per liter of anhydrite suspension, will be sufficient to effect desired stabilization. It is to be understood, of course, that although I have indicated that a .1% amount of soluble glycolate (.1 gram per 100 grams of $CaSO_4$) is useful in the invention, it will be apparent that smaller or greater amounts may also be employed and with equally satisfactory results. Thus, in my preferred adaptation, I employ amounts of soluble glycolate compounds ranging from, say, .05% to 1% (1 gram per 100 grams of $CaSO_4$). While for most practical purposes this range will prove sufficient, higher concentrations, and up to, say, 10% (10 grams per 100 grams of $CaSO_4$) may also be employed, if desired, and with beneficial results.

It will be found that the pH of the calcium sulfate slurry to which the glycolate is added will have a limiting effect upon its inhibiting properties. In practice, I have found it advantageous to maintain the pH of the reaction system within a range of, say, 4 to 10 or higher.

The specific effect which cellulose glycolate treatment has upon calcium sulfate, as compared with an albuminoid such as glue, is illustrated by the following experiments:

A 20% aqueous slurry of freshly precipitated insoluble anhydrite was adjusted to 7.5 pH with caustic soda and divided into five portions. The anhydrite already contained 3.7% of the $CaSO_4$ as gypsum. One part was used as control. A second part was treated with 0.1% glue (based on $CaSO_4$) and the remaining parts were treated with 0.05, 0.1 and 0.4% sodium cellulose glycolate, respectively. It was added as a 2% solution but calculated as the amount of the glycolate compound. The various samples were analyzed for gypsum periodically over a period of 75 days with the following results:

| Sample | Treatment | Days standing | | | |
|---|---|---|---|---|---|
| | | 8 | 25 | 44 | 75 |
| | | Per cent | Per cent | Per cent | Per cent |
| 1 | Control | 20.1 | 92.1 | 100 | |
| 2 | .1% glue | 12.7 | 48.4 | 90.4 | 100 |
| 3 | .05% cellulose glycolate | 5.2 | 7.2 | 10.1 | 15.1 |
| 4 | .1% cellulose glycolate | 4.9 | 5.9 | 7.3 | 8.9 |
| 5 | .4% cellulose glycolate | 5.4 | 6.1 | 6.4 | 8.6 |

Thus it will be seen that the inhibiting effect which cellulose glycolate has upon the formation of gypsum is far more efficient than glue.

In another series of experiments handled in a similar manner, a comparison of starch and cellulose glycolate with an albuminoid, such as glue, was made on a freshly precipitated anhydrite product, after washing free from acid and adjusting the slurry to a pH of about 7 with a small amount of lime water:

| No. | Treatment | Days standing | | |
|---|---|---|---|---|
| | | 18 | 46 | 74 |
| | | Per cent | Per cent | Per cent |
| 1 | Control | 75.4 | 100 | |
| 2 | .1% glue | 54.8 | 100 | |
| 3 | .1% starch glycolate | 8.5 | 12.5 | 17.1 |
| 4 | .1% cellulose glycolate | 5.8 | 6.9 | 8.6 |

Decomposition of the glue was observed to have started after samples had been standing for 15 days. This decomposition not only caused loss of the preserving agent but resulted in a most offensive odor.

The alkali metal salts of cellulose and starch glycolate of the present invention do not possess this disadvantage. They readily dissolve in water to give a very viscous solution and have excellent stability. Bacterial decomposition has not been observed and offensive odors such as are encountered with glue treatments are therefore absent in these solutions. These properties make the glycolate compounds much more desirable than the proteins such as glue. Furthermore, these are more powerful and less of the reagent is necessary as is shown by the data above.

Although the invention has been exemplified in a particular embodiment involving the stabilization of calcium sulfate, as has been indicated, stabilization and impartation of growth-resistant properties to other types of pigment-useful crystalline materials by treating the same with soluble glycolates is contemplated. Thus, aqueous slurries of other alkaline earth metal sulfates, such as barium sulfate, strontium sulfate, or carbonates thereof, such as calcium carbonate, barium carbonate or strontium carbonate, may be similarly treated with a solution of cellulose or starch glycolate, whereby such compounds become equally stabilized and growth-resistant.

The invention is also particularly effective when the pigment-useful extenders or fillers, and especially insoluble anhydrite, are used in conjunction with a prime pigment for employment in aqueous vehicles, such as casein or water paints, or in any system that permits the extender or filler to come into contact with appreciable amounts of water for prolonged periods. Likewise, the treatment afforded by the present invention is equally valuable in many other aqueous compositions containing pigment-useful crystalline materials, such as in shoe polishes and paper pigmentation suspensions. In such instances hydration of the soluble crystalline material, and especially calcium sulfate, occurs and ultimately proceeds to completion. This hydration can be effectively delayed and prevented by pretreating the extender or filler with any of the water-soluble glycolates of the present invention, the glycolate apparently becoming adsorbed on the individual particles of the extender or filler, thereby forming a protective film against rehydration and remaining with the extender after drying. As a result, the composition then becomes more resistant to chemical and physical changes than without the treatment afforded by my invention.

Similarly, it will be found that the beneficial effects afforded by my novel method of treatment do not cease when the pigment is dried and packaged. The treated pigment continues to exhibit improved resistance to hydration when suspended in water, provided it has not been heated to an unduly high temperature during drying. In order to avoid decomposition of the organic treating agent, it will be found preferable to conduct the drying operation at relatively low temperatures, such as under vacuum or by steam drying.

As will be seen, without the use of my novel inhibiting agents in calcium sulfate or similar extender or filler production, a distinct tendency towards formation of long, needle-like gypsum particles exists, these particles being very undesirable because of their tendency to rapidly settle from a vehicle or liquid and act as coarse gritty components in the composition, when applied or used on a particular surface. In contrast to this, compositions containing pigments and extenders treated in accordance with my invention will be found to maintain the same fluidity, particle size of solids, chemical state and other desired pigmentary properties over periods which are sufficiently long to assure uniformity of product even after prolonged shelf storage. Such assurance could not be had with prior treating agents, such as glue, even when employed in greater and excessive amounts, due to the tendency of such agents to decompose and thus be rendered completely ineffective.

I claim as my invention:

1. A process for stabilizing pigment-useful alkaline earth metal compounds from the group consisting of sulfates and carbonates against particle size increase, comprising intimately associating said compounds with from about .05 to 10% of a water-soluble glycolate.

2. A process for stabilizing pigment-useful alkaline earth metal compounds from the group consisting of sulfates and carbonates against particle size increase, comprising adding from about .05 to 10% of a water-soluble glycolate in solution to an aqueous slurry containing said compounds.

3. A process for treating pigment-useful alkaline earth metal compounds from the group consisting of sulfates and carbonates to render them stable and resistant to particle size increase, comprising adding a .1–5% solution of a water-soluble glycolate to an aqueous suspension of said compounds.

4. A process for stabilizing pigment-useful alkaline earth metal compounds from the group consisting of sulfates and carbonates against hydration and particle size growth, comprising contacting said compounds while in aqueous suspension with about .05% to 1% of a water-soluble glycolate.

5. A process for stabilizing anhydrite against hydration and particle size increase, comprising adding about .05% to 10% of a water-soluble glycolate to an aqueous slurry containing the anhydrite.

6. A process for stabilizing anhydrite against hydration and particle size increase, comprising adding a .1–5% solution of a water-soluble glycolate to an aqueous suspension containing said anhydrite whereby from about .1–5% of said glycolate becomes intimately associated with said anhydrite.

7. A process for stabilizing anhydrite to render the same stable and resistant towards hydration and particle size increase, comprising adding a .1–5% solution of a water-soluble glycolate to an aqueous slurry substantially immediately following formation of the insoluble anhydrite in said slurry whereby from about .1–5% of said glycolate becomes intimately associated with said anhydrite.

8. A process for stabilizing anhydrite against hydration, comprising contacting the anhydrite with an aqueous solution of from .05% to 1% of a water-soluble glycolate.

9. A process for stabilizing anhydrite against hydration, comprising contacting the anhydrite with an aqueous solution of .1 gram to 1 gram of a water-soluble glycolate per 100 grams of calcium sulfate.

10. A process for stabilizing anhydrite against hydration, comprising contacting the anhydrite with .05% to 10% of a solution of a water-soluble glycolate, based on the weight of said anhydrite.

11. As a new composition of matter, an alkaline earth metal compound from the group consisting of sulfates and carbonates, and about .05 to 10% of a water-soluble glycolate, said composition, when in contact with aqueous media, being stable and resistant against hydration and particle size increase.

12. As a new composition of matter, anhydrite and about .05 to 10% of a water-soluble glycolate, said composition when in contact with aqueous media being stable and resistant against hydration.

13. As a new composition of mater, anhydrite and 0.5% to 10% of a water-soluble glycolate, said composition when in contact with water being stable and resistant against hydration.

14. As a new composition of matter, anhydrite and .05% to 1% of a water-soluble glycolate, said composition when in contact with water being stable and resistant against hydration.

15. As a new composition of matter, anhydrite and .05% to 1% of a water-soluble alkali metal salt of cellulose glycolate, said composition when in contact with water being stable and resistant against hydration.

16. As a new composition of matter, anhydrite and .05% to 1% of a water-soluble alkali metal salt of starch glycolate, said composition when in contact with water being stable and resistant against hydration.

ROY WILLIAM SULLIVAN.